United States Patent [19]

Bleasdale

[11] Patent Number: 5,374,466

[45] Date of Patent: Dec. 20, 1994

[54] FORMER FOR USE IN THE MANUFACTURE OF FIBERGLASS ARTICLES

[75] Inventor: Desmond H. Bleasdale, Brookvale, Australia

[73] Assignee: Desglo Pty. Ltd., New South Wales, Australia

[21] Appl. No.: 119,481

[22] Filed: Sep. 13, 1993

Related U.S. Application Data

[63] Continuation of Ser. No. 768,598, Oct. 2, 1991, abandoned.

[30] Foreign Application Priority Data

Apr. 11, 1989 [AU] Australia ............................ PJ3640

[51] Int. Cl.$^5$ ............................ B32B 3/06; B32B 3/24
[52] U.S. Cl. .................... 428/131; 428/137; 428/167; 428/181; 428/156; 428/174; 249/37; 249/113; 52/381; 52/380; 52/382; 52/383
[58] Field of Search ............... 428/131, 137, 167, 181, 428/156, 174; 249/37, 113; 52/381, 380, 382, 383

[56] References Cited

U.S. PATENT DOCUMENTS

| | | | |
|---|---|---|---|
| 335,461 | 2/1886 | Latulip | 428/137 |
| 2,987,240 | 6/1961 | Boyer et al. | 428/131 |
| 3,126,978 | 3/1964 | Bergstrom | 428/131 |
| 3,352,079 | 11/1967 | Strong | 52/381 |
| 3,419,457 | 12/1968 | Bleasdale | 428/131 |
| 3,438,312 | 4/1969 | Becker et al. | 428/137 |
| 4,118,261 | 10/1978 | Pedler | 428/137 |
| 4,133,481 | 1/1979 | Bennett | 428/131 |
| 4,563,374 | 1/1986 | Treber et al. | 428/167 |
| 4,577,700 | 2/1986 | Mantarro et al. | 428/17 |
| 4,596,731 | 6/1986 | Cudmore et al. | 428/44 |
| 4,695,033 | 9/1987 | Imaeda et al. | 249/113 |
| 4,752,520 | 6/1988 | Franklin | 428/161 |
| 4,923,733 | 5/1990 | Herbst | 428/156 |

FOREIGN PATENT DOCUMENTS 1104490 2/1968 United Kingdom .

OTHER PUBLICATIONS

Supplementary European Search Report for EP 90 906063.
Patent Abstract of Japan vol. 8, No. 96, of Appl. No. 57-121033.

*Primary Examiner*—William P. Watkins, III
*Attorney, Agent, or Firm*—Morton J. Rosenberg; David I. Klein

[57] ABSTRACT

A former for supporting a layer of settable plastics material while it sets into hollow reinforcing ribs bonded to a laid up article of fibre reinforced plastics material during manufacture of said article, comprising a foraminous sheet (5) wherein the region of the sheet between each pair of neighbouring holes (6) is elevated above the plane in which the rims of the holes are disposed by means of one or more upstanding formations (7) joined to one another by a flexible web (10). The upstanding formations have rigidifying patterns (11) formed thereon. An article produced using the former is also disclosed.

16 Claims, 4 Drawing Sheets

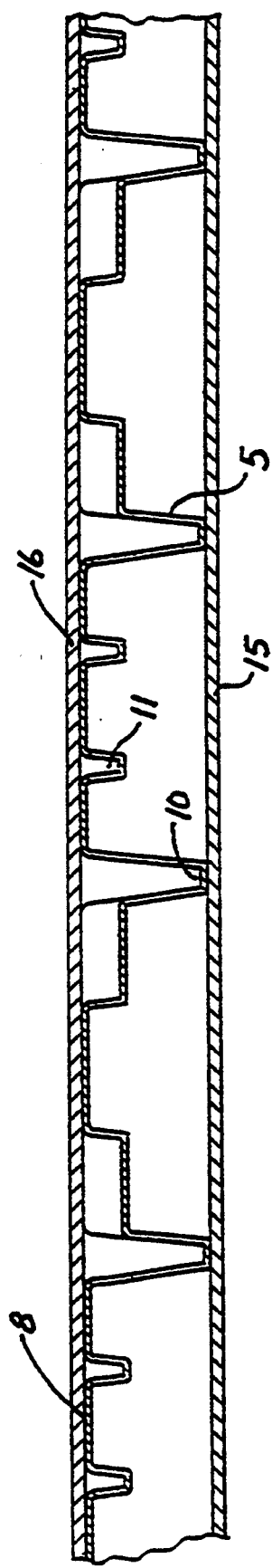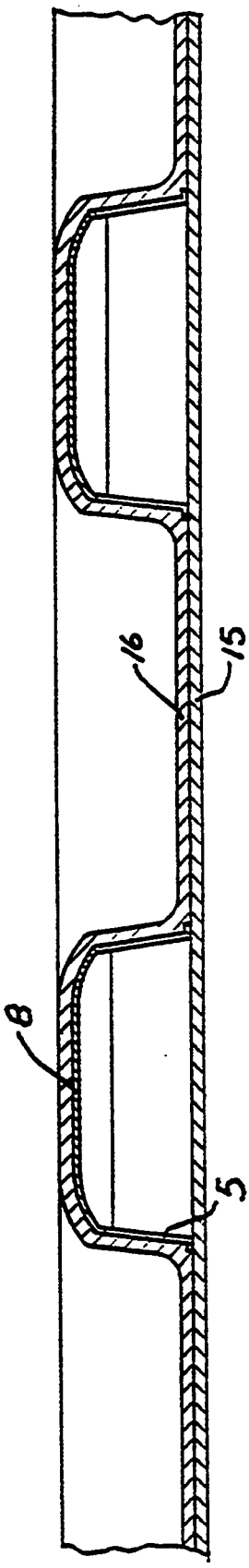

FORMER FOR USE IN THE MANUFACTURE OF FIBERGLASS ARTICLES

This is a continuation of copending application Ser. No. 07/768,598 filed on Oct. 2, 1991, now abandoned which is a 371 of PCT/AU90/00139 filed Apr. 10, 1990.

TECHNICAL FIELD

In the manufacture of all kinds of sheet-like articles or articles having sheet-like portions it is commonplace to stiffen the article, or portions of the articles as the case may be, by means of ribs applied to one or both sides thereof. The present invention relates to the formation of such stiffening ribs in particular to the formation of hollow stiffening ribs composed of a hard setting synthetic plastics material such as polyester resins, epoxy resins, vinyl esters or the like, preferably with reinforcing fibres, for example, glass, carbon, plastic or natural fibres, embedded in the resinous or plastics material.

Articles of fibre reinforced plastics material, including hollow stiffening ribs thereof, may be made by "laying up", that is to say by placing a layer of woven or non-woven reinforcing fibres upon a mould surface and then painting or impregnating that layer with the hard-setting plastics material while in a liquid or pasty state and subsequently allowing or causing the plastics to set. Alternatively, a mixture of unset resin and short fibres may be applied to the mould surface in one operation.

BACKGROUND ART

Hitherto, hollow stiffening ribs of the kind under discussion have been made by applying bulky, low strength, ropes of paper, wooden slats or other cheap former elements, to one side of a sheet-like article or article portion and subsequently covering those elements with a layer of the settable rib material which sets and becomes bonded to the main body of the sheet intermediate the elements, but is held away from the main body by the elements so constituting filled or hollow ribs.

While the above described method of providing stiffening ribs is generally satisfactory, it is not entirely so, primarily because of the difficulty of holding the former elements in position relative to each other, especially if it is desired to run stiffening ribs in two directions substantially at right angles to each other. These other methods substantially increase the weight and/or cost of the product.

One method of overcoming these problems has been to use a former comprising a foraminous sheet in which the areas between adjacent holes comprise a grid of spaced apart, arch-sectioned longitudinal members and spaced-apart, arch-sectioned transverse members and said members being integrally united at the respective intersection points.

Though this method provides a great improvement over previous arrangements it still has several disadvantages. In order to produce the arch-sectioned members used in this known method the material used to make the former must be substantially rigid and have sufficient mechanical strength to support a layer of settable plastics material. A distinct disadvantage of known formers, when applied to the production of shaped articles having complex curves, is their lack of flexibility and inability to follow the complex curves without losing or distorting the original designed shape and losing their effectiveness.

DISCLOSURE OF THE INVENTION

The present invention seeks to overcome or at least ameliorate these disadvantages by providing a former which is flexible and can be made from thin light material that will maintain its designed shape whilst contorting to a simple or compound curve.

According to the first aspect, the present invention provides a former adapted to support the layer of settable plastics material while it sets into hollow reinforcing ribs bonded to a laid up article of fibre reinforced plastics material during manufacture of said article comprising a foraminous sheet wherein the region of the sheet between each pair of neighbouring holes is elevated above the plane in which the rims of the holes are disposed by means of one or more upstanding formations joined to one another by a flexible web.

For preference the upstanding formations are provided with generally level lands lying parallel to the plane of the sheet. Preferably, the upstanding formations are joined at their bases but may be connected at any level between the formations. For preference, said land is provided with a rigidifying formation. Preferably, the rigidifying formation comprises one or more depressions or patterns of depressions formed in the surface of said land, said depressions arranged to resist flexing of the land transverse thereto.

BRIEF DESCRIPTION OF DRAWINGS

Preferred embodiments of the invention will now be described, by way of example only, with reference to the accompanying drawings in which:

FIG. 4 is an enlarged section view, similar to FIG. 2, with the fibreglass laid up;

FIG. 5 is an enlarged section view, similar to FIG. 3, with the fibreglass laid up;

DESCRIPTION OF PREFERRED EMBODIMENTS

Figure 1:
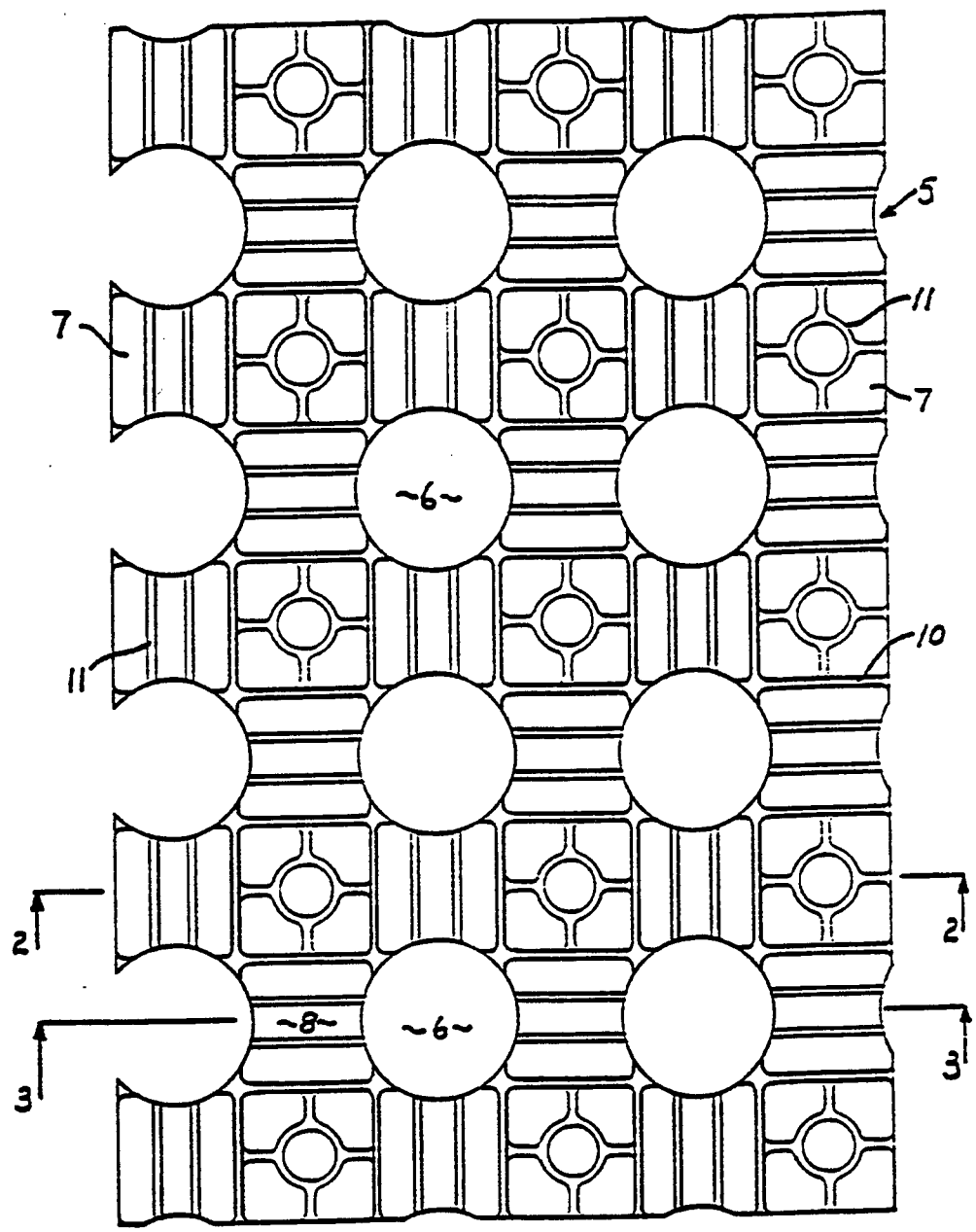
FIG. 1 is a plan view of a former according to one embodiment of the invention.
Figure 2:
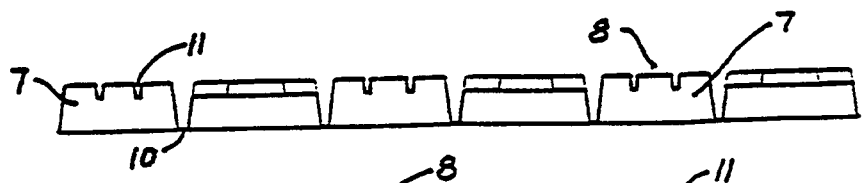
FIG. 2 is a section view taken on line 2—2 of FIG. 1.
Figure 3:
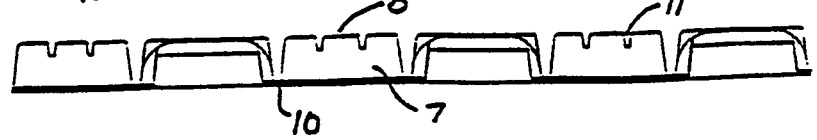
FIG. 3 is a section view taken on 3—3 of FIG. 1.
Figure 7:
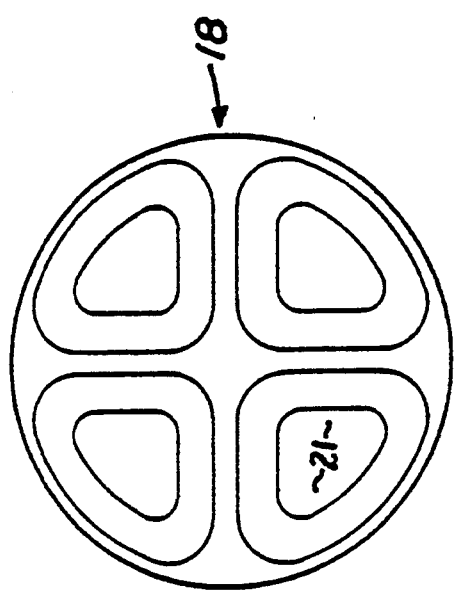
FIG. 7 is a plan view of the filler element shown in FIG. 6.

Referring to FIGS. 1 to 3, the former according to this embodiment a foraminous sheet 5 formed from an inexpensive mouldable material such as paper mache, fibreglass or plastics material. In this example, the former is converted from a sheet 5 of plastics or film material.

The sheet 5 is pierced by a plurality of holes 6 arranged in an orderly array of intersecting rows and the material of the sheet 5 is formed into a one or more upstanding formations 7 having substantially planar upper surfaces forming lands 8. Each formation 7 is joined to adjacent formations at their bases 9 by a flexible wed 10.

Figure 8:
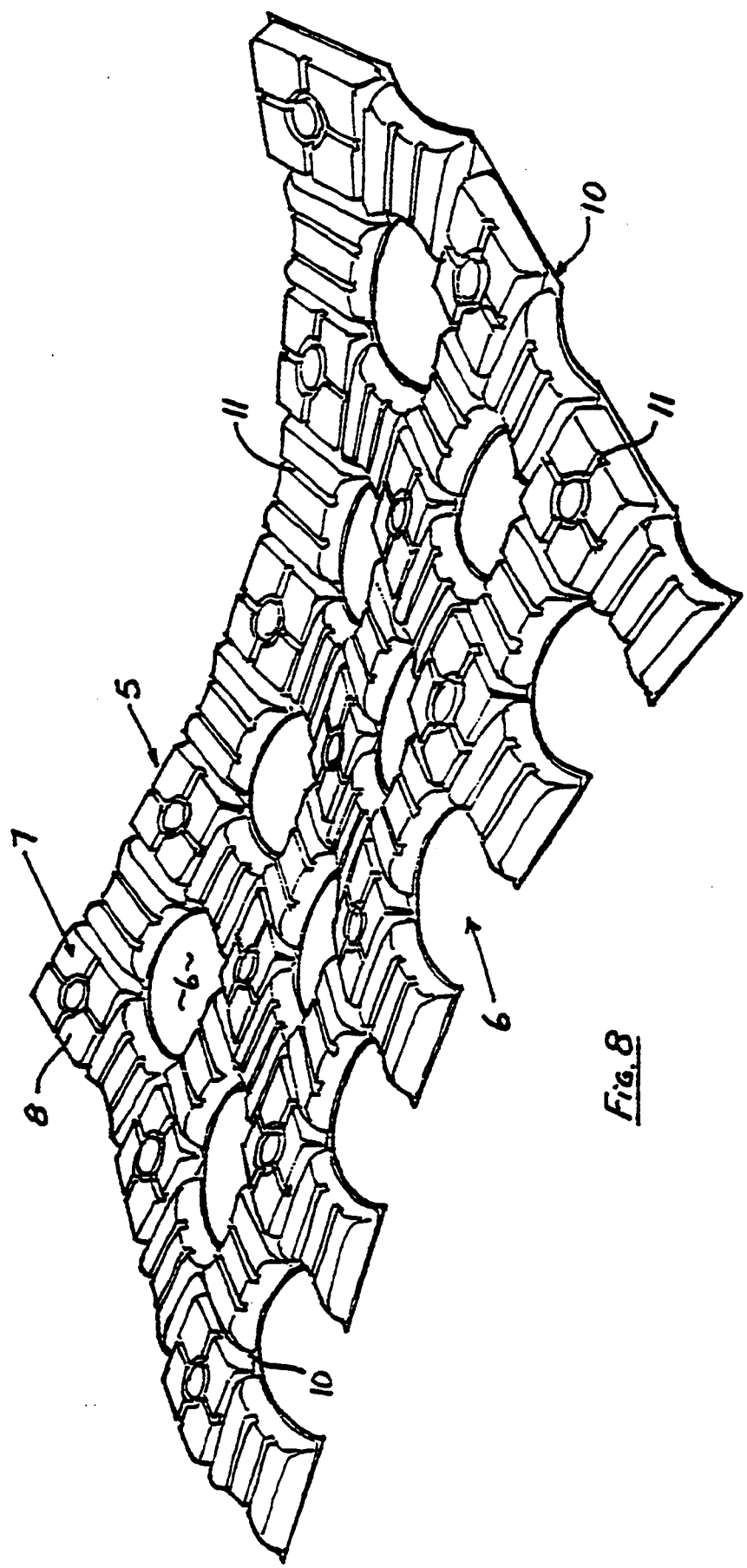
FIG. 8 is a perspective view of the former of FIG. 1, illustrating the ability to assume complex curves.

In order to prevent inward deformation of the lands 8 during the laying Up process, the lands 8 are rigidified by a pattern of depressions or grooves 11 formed in the surface of the sheet. The grooves 11 have been found to resist transverse bending or flexing and thus effectively rigidify the lands 8 while still allowing the former to assume complex forming shapes as best shown in FIG. 8.

The patterns applied to the lands are preferably symmetrical and repeated so to allow for nesting and overlapping of sheets. This assists in joining fixed sized sheets into any sized sheet required. In joining the former sheets 5 the former sheets may be overlapped at the edges by nesting one row of formations 7 within the upstanding formations on the mating edge of a further sheet. The sheets may equally be merely abutted edge to edge and the laying up process used to form a permanent joint.

As best shown in FIGS. 4 and 5, when the former is to be used it may be applied to sheet 15 which may be of any suitable material, including fibre reinforced synthetic resin, with the rims of the holes 6 in contact with the sheet 15 and the upstanding formations 7 projecting upwardly therefrom.

A layer of fibre reinforced synthetic resin 16 may then be applied to the exposed surface so as to contact and bond with the sheet 15 through the holes 6. Once these parts of layer 16 which are supported by the formations 7 set, they constitute stiffening ribs on the original sheet 15.

If the former is to be applied to a sheet of sharp or complex curvature, the provision of flexible webs 10 enables the former to be bent as required to follow the curved surface. (See FIG. 8).

Figure 6:
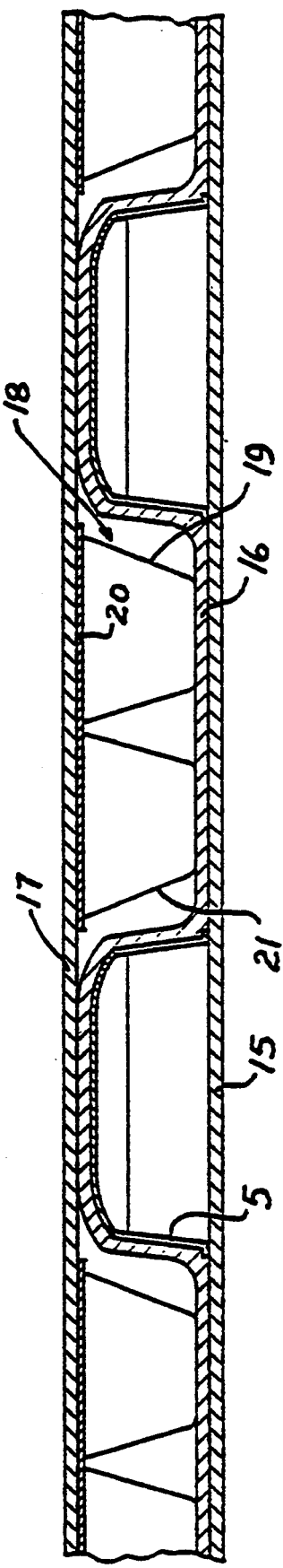
FIG. 6 is an enlarged section view, similar to FIG. 5, with the further planar layer of fiberglass applied to a form a sheet.

The plastics layers supported or formed on the former according to the invention may also be sandwiched between the sheet 15 and a further sheet 17 as shown in FIG. 6 to constitute a light weight, rigidifying filling or core for composite panel structures or the like. This further sheet 17 may be preformed of fibre glass reinforced plastic or other sheet material and bonded to sheet 16 prior to sheet 16 becoming set or post laying up sheet 17 in the conventional manner.

When applying the further sheet 17 to the structure it may be desirable to prevent sagging or deformation of the sheet into the depression formed by laying up into hole areas 6. To prevent this sagging a filler element 18 may be placed into the depression so as to support the sheet 17.

In this embodiment, the filler element 18 is of stool-like construction, however, any suitable filling element may be used. The filler element of this embodiment may be formed during production of the sheet of the intended location of the holes 6. When the holes are cut out the filling element is removed. This procedure avoids any unnecessary wastage of material. Further the stool element 19 may be provided with a flat lid 20 which sits on the top of the stool element prevent entry of material into the hollow legs 21 of the stool element.

Materials other than those described above may be used, it being appreciated that the former itself requires very little strength, merely enough to support a thin layer of resinous material, and, even then, only for so long as it is necessary for the resin of that layer to set.

Further, it will be appreciated that the holes in the foraminous sheet may be irregularly or randomly disposed and may be of differing shapes and/or sizes.

It will be apparent to those skilled in the art, that further embodiments of the invention are possible and the invention is not limited to the specific examples described.

What is claimed is:

1. A former for supporting a layer of settable plastics material while it sets into hollow reinforcing ribs bonded to a laid up article of fiber reinforced plastics material during manufacture of said article, comprising a foraminous sheet extending in a longitudinal and transverse direction wherein said sheet includes a plurality of holes formed therethrough defined by respective hole rims in substantially a first plane wherein a region between each pair of neighbouring holes is elevated above said first plane in which the rims of said holes are disposed by means of one or more upstanding formations defining formation upper surfaces lying in a second plane vertically displaced from said first plane, said upstanding formations joined to one another by a separate flexible web in said first plane extending therebetween, said flexible web constituting a portion of said foraminous sheet, said formation upper surfaces having means for rigidifying said upstanding formations formed therein, and wherein hollow spaces are defined between said upstanding formations which define said formation upper surfaces and said first plane.

2. A former according to claim 1, wherein the upstanding formation upper surfaces define generally level lands lying parallel to the plane of said flexible web.

3. A former according to claim 2, wherein said means for rigidifying said upstanding formations comprises one or more depressions or patterns of depressions formed in the surface of said lands, said depressions arranged to resist flexing of the land transverse thereto.

4. A former according to claim 3, wherein said patterns applied to the lands are symmetrical and repeated so as to allow nesting and overlapping of sheets.

5. A former according to claim 1, wherein said holes are arranged in an array of rows substantially parallel to the edges of the sheet.

6. A former for supporting a layer of settable plastics material while it sets into hollow reinforcing ribs bonded to a laid up article of fibre reinforced plastics material during manufacture of said article, comprising a foraminous sheet extending in a longitudinal and transverse direction wherein said sheet includes a plurality of holes formed therethrough defined by respective hole rims in substantially a first plane wherein a region between each pair of neighbouring holes is elevated above said first plane in which the rims of said holes are disposed by means of one or more upstanding formations defining formation upper surfaces lying in substantially a second plane vertically displaced from said first plane, said upstanding formations joined to one another by a separate flexible web in said first plane extending therebetween, said flexible web constituting a portion of said foraminous sheet having said holes formed in the plane of said web and wherein hollow spaces are defined between said upstanding formations which define said formation upper surfaces and said first plane.

7. A former as recited in claim 6, wherein the upstanding formation upper surfaces define substantially level lands lying substantially parallel to the plane of the flexible web.

8. A former as recited in claim 7, wherein one or more of said lands is provided with a rigidifying formation.

9. A former as recited in claim 8, wherein said rigidifying formation comprises one or more depressions or patterns of depressions formed in the surface of said land, said depressions arranged to resist flexing of the land transverse thereto.

10. A former as recited in claim 9, wherein said patterns applied to the lands are symmetrical and repeated so as to allow nesting and overlapping of sheets.

11. A former as recited in claim 6, wherein said holes are arranged in an array of rows substantially parallel to the edges of the sheet.

12. A former for supporting a layer of settable plastics material while it sets into hollow reinforcing ribs bonded to a laid up article of fiber reinforced plastics material during manufacture of said article, comprising a foraminous sheet extending in a longitudinal and transverse direction wherein said sheet includes a plurality of holes formed therethrough defined by respective hole rims in substantially a first plane wherein a region between each pair of neighbouring holes is elevated above said first plane in which the rims of said holes are disposed by means of one or more upstanding formations forming formation upper surfaces lying in substantially a second plane vertically displaced from said first plane, said upstanding formations joined to one another by a separate flexible web in said first plane extending therebetween, said flexible web constituting a portion said foraminous sheet, said formation upper surfaces having longitudinally and transversely extending depressions or patterns of depressions formed therein for rigidifying said former, and wherein hollow spaces are defined between said upstanding formations which define said formation upper surfaces and said first plane.

13. A former as recited in claim 12 wherein the upstanding formation upper surfaces form substantially level lands lying substantially parallel to the plane of said flexible web.

14. A former as recited in claim 13, wherein said depressions or patterns of depressions are formed in the upper surface of said lands, said depressions arranged to resist flexing of the land transverse thereto.

15. A former as recited in claim 14, wherein said patterns applied to the lands are symmetrical and repeated so as to allow nesting and overlapping of sheets.

16. A former as recited in claim 12, wherein said holes are arranged in an array of rows substantially parallel to the edges of the sheet.

* * * * *